United States Patent

[11] 3,631,687

[72] Inventors: Robert E. Brooks, Worthington; John M. Ewart, Columbus; James E. Randall, Worthington, all of Ohio
[21] Appl. No.: 16,289
[22] Filed: Mar. 4, 1970
[45] Patented: Jan. 4, 1972
[73] Assignee: Ranco Incorporated, Columbus, Ohio
Continuation-in-part of application Ser. No. 852,402, Aug. 22, 1969, now abandoned. This application Mar. 4, 1970, Ser. No. 16,289

[54] SENSING MEANS FOR AIR-CONDITIONING SYSTEMS AND THE LIKE
13 Claims, 5 Drawing Figs.
[52] U.S. Cl. .................................................... 62/227, 73/359
[51] Int. Cl. .................................................... F25b 1/00
[50] Field of Search ....................................... 73/359; 62/156, 227, 222–225

[56] References Cited
UNITED STATES PATENTS
| | | | |
|---|---|---|---|
| 2,947,153 | 8/1960 | Atchison | 62/262 |
| 3,075,387 | 1/1963 | Rademacher | 73/359 |
| 3,004,400 | 10/1961 | Mann | 62/156 |

Primary Examiner—Meyer Perlin
Attorney—Watts, Hoffmann, Fisher & Heinke

ABSTRACT: A thermistor for effecting control of a heat exchanger in an air-conditioning system is located in a closed ended tube inside an air duct and extending transversely thereof. The tube has a series of spaced openings in a first section thereof which faces upstream of the moving air in the duct and a second section of the tube has a single opening facing downstream. The thermistor is located in a closed wall section of the tube intermediate the first and second sections. The total area of the single opening facing downstream is greater than the total area of the openings facing upstream, and the area of the cross section of the tube interior is greater than the total area of the ports facing upstream. In one form of the invention the areas of the openings in the tube facing upstream progressively increase as the distance of the openings from the transistor increase.

PATENTED JAN 4 1972

3,631,687

INVENTORS
ROBERT E. BROOKS
JOHN M. EWART
JAMES E. RANDALL
BY
Watts, Hoffmann, Fisher & Heinke
ATTORNEYS

SENSING MEANS FOR AIR-CONDITIONING SYSTEMS AND THE LIKE

RELATED APPLICATIONS

The present application is a continuation-in-part of U.S. Ser. No. 852,402, filed Aug. 22, 1969, Group 345 and now abandoned.

BACKGROUND OF THE INVENTION

It is desirable to control the operation of an air-tempering or conditioning system according to the sensed condition of air passing through a distribution duct or the like and certain control apparatus for this purpose comprise a sensor element which is relatively minute, such as a thermistor. It has been found that air forced through the usual air ducts is not uniform in the condition to be controlled, such as temperature, throughout the cross section of the duct and therefore a small sensor merely located in the duct cannot be relied upon to indicate the average condition of the air.

THE PRESENT INVENTION

The principal object of the present invention is the provision of a new and improved means for subjecting a relatively small sensing element to a flow of air which is representative of the average or mean condition of air flowing in an air duct of an air-conditioning or tempering system.

More specifically, it is an object of the present invention to provide a tubular air conduit structure in an air duct of an air-conditioning system and having sidewalls extending transversely of the air flowing in the duct, a first section of the walls of the tubular structure having a series of spaced openings therealong facing upstream so as to receive a plurality of relatively small air streams into the tube from a plurality of locations transversely of the flow of air, and an opening in the walls of a second section of the tube facing downstream, and a sensor element in the tube between the first section of the tube and the outlet facing downstream so as to be subjected to the air in the tube flowing to the outlet. The total area of the openings facing upstream is less than the area of the opening facing downstream, and less than the cross-sectional area of the tube so that air will enter the tube through the upstream facing openings, mix in the tube and exit through the outlet opening facing downstream and in so doing cause a mixture of air to flow over the sensor which is representative of the average air condition in the duct. In some instances, particularly where the air duct is relatively wide or deep, the air flow may be characterized by velocity patterns as well as wide temperature gradients. When these are apt to be present the openings in the tubular air conduit facing upstream are preferably graduated in size or area so that the openings which are locate increasingly distant from the sensor element are progressively larger in area. The optimum areas of such openings can be determined by calculating the openings to provide the increase in volume of air entering the duct required to compensate for the longer flow path from a particular opening to the outlet opening.

Other objects and advantages of the invention will be apparent from the following description of a preferred form thereof, reference being made to the accompanying drawings wherein.

Figure 1:
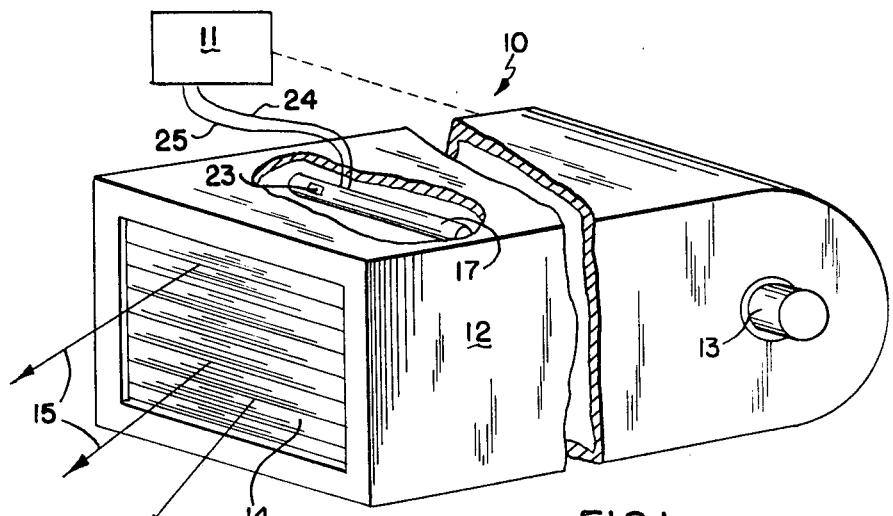
FIG. 1 is a more or less schematic view of a room air conditioner system embodying the invention, certain elements of the conditioner system being shown broken away.
Figure 2:
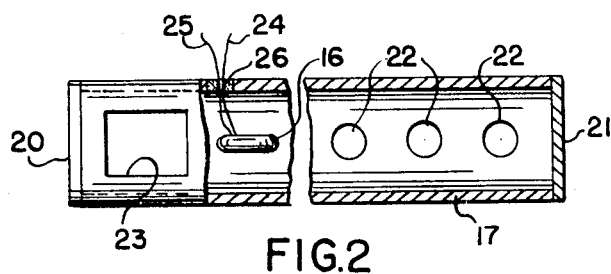
FIG. 2 is a fragmentary broken away view of an air temperature sensing tube and a sensor element therein.

Referring to the drawings, a conventional air-conditioning system 10 is shown for cooling and dehumidifying the air of a room, not shown. The air-conditioning system 10 include a compressor-condenser-evaporator type refrigerating apparatus shown schematically at 11 which furnishes chilled air to an air duct 12 for distribution into a room, or the like, The duct 12 includes a blower, the motor of which is shown at 13, which forces air from the refrigeration apparatus 11, through the duct 12 and into a room through a grille 14, as is indicated by arrows 15.

The operation of the refrigerating apparatus 11 is controlled by a room thermostat and also in accordance with the temperature of the air discharged through the grille 15. This control is effected by a conventional control apparatus, not shown in detail, which includes a thermistor 16 having relatively small dimensions. It has been found that tempered air blown through a duct is not a uniform temperature throughout the cross section of the stream but has strata of different temperatures. It is therefore impractical to rely on controlling the refrigerating system 11 according to the temperature of a relatively narrow strata of air in the duct to which the thermistor 16 would respond if it were subject directly to the air stream in the duct. According to the present invention the thermistor 16 is subjected to an averaging of the temperatures of the various strata of air in the air stream passing through the duct 12. This averaging is accomplished by locating the thermistor within a sensor tube 17.

The tube 17 is cylindrical and of uniform diameter and extends across a substantial portion of the duct 12 so that the walls thereof project transversely to the flow of air through the duct. In the form shown, the tube 17 is supported adjacent the top wall of the duct 12. The ends of the tube 17 are closed by end walls 20, 21. A series of openings 22 are formed along one section of the tube 17 towards the end wall 21. The openings 22 are preferably spaced equidistant apart and they are located in a section of the tube extending approximately half the width of the air duct. The openings 22 are arranged to face upstream with respect to the air traveling through the duct 12. A relatively large opening 23 is formed in a section of the tube 17 adjacent the end wall 20 and faces downstream with respect to the airflow through the duct 12.

The thermistor 16 is suitably supported on the axis of the tube 17 intermediate the opening 22 most remote from the end wall 21, and the opening 23. Wires or leads 24, 25 extend from the thermistor 16 and pass through a dielectric plug 26 in the wall of tube 17 to the control apparatus for the refrigerating system 11.

It should be noted that the sum of the areas of the openings 22 is less than the area of the opening 23. Further, the cross sectional area of the tube 17 is greater than the sum of the areas of the openings 22. These relative areas promote a positive flow of air into the tube and around the thermistor 16.

Figure 4:
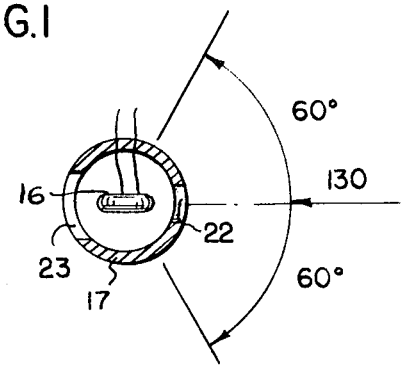
FIG. 4 is a sectional view of the tube taken on line 4—4 of FIG. 3.
Figure 3:
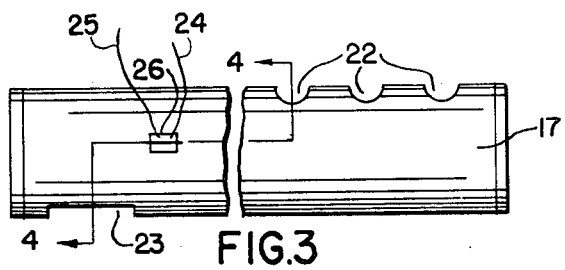
FIG. 3 is a fragmentary top view of the tube shown in FIG. 2.

In operation, relatively small air streams across a substantial section of the air duct 12 enter the openings 22, mix within the tube 17, pass over the thermistor 16 and exit through the opening 23. It has been found that the air entering the tube 17 and passing towards the opening 23 is so intermixed that the temperature of the air actually contacting the thermistor 16 will be an average of the temperature of the various strata of the air directed through the duct 12. Thus, the thermistor 16 will accurately sense the mean temperature of the air discharged from the register 14. This will be true regardless of the variation in air velocity in the duct. Furthermore, it will remain effective although the tube 17 may be rotated on its axis up to 60° on either side of the line of direction of the air normal to the surface of the openings 22 which is indicated at 30 in FIG. 4.

In some instances more satisfactory results are obtained if the openings 22 of the tube 17 gradually increase in area towards the end of the tube 21 which is remote from the sensor 16. This modification is particularly appropriate where the air duct in which the tube is to be located is relatively wide and the tube 17 therefore relatively lengthy.

Figure 5:
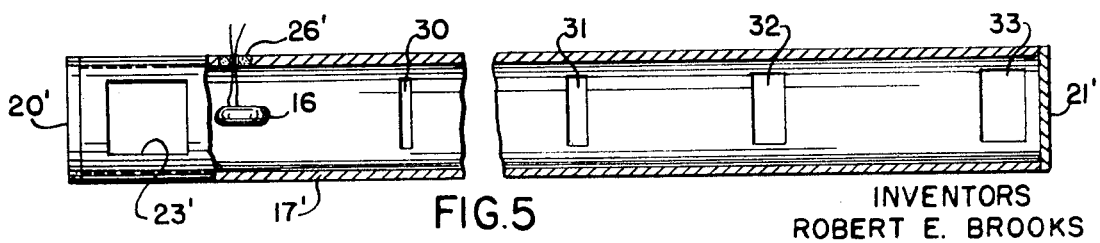
FIG. 5 is a view similar to FIG. 2 but showing a different form of the invention.

This form of tube is shown at 17' in FIG. 5. The tube 17' is like tube 17 and like parts are referred to by the same reference characters bearing a prime. The air inlet openings facing upstream, however, are indicated at 30, 31, 32 and 33. The area of the opening 31 is greater than the area of the opening 30. The area of the opening 32 is greater than the area of opening 31 and the area of opening 33 is greater than the area of opening 32. In other words, the areas of the openings spaced progressively from the sensor 16 progressively increase.

As pointed out with reference to the tube 17, the total area of the upstream openings in the tube 17' are less than the area of opening 23'. Also, the cross-sectional area of the tube 17' is greater than the sum of the areas of the upstream openings.

The sizes of the openings 30, 31, 32, 33 can be determined by calculating the required additional volume of air to be admitted through each opening to compensate for the additional length of airflow to the outlet 23' so that substantially equal volumes of air from all of the openings will combine and flow around the transistor 16.

By the invention a relatively small sensor body can be made to respond to an average temperature or condition of an air stream having variations in various strata thereof. The invention is applicable to various types of air-conditioning systems other than air-cooling systems, such as heating or humidifying.

We claim:

1. In an air-conditioning system including an air duct for conducting air subject to conditioning and a blower for moving air through said duct, control means for said air conditioning system comprising a relatively small sensor element, and wall means forming an elongated air conduit extending transversely of a substantial portion of the stream of air flowing in said duct and having a cross-sectional area substantially less than the cross-sectional area of said duct, a first section of said wall means facing upstream of the airflow in said duct being open along a substantial width of said duct and facing upstream of said duct to receive air moving downstream in said duct in a plurality of areas transversely of said duct, said wall means having an opening in a second section thereof positioned to be shielded from the downstream airflow in said duct, and means locating said sensor element to sense a condition of air exiting through said open second section of said conduit.

2. An air-conditioning system as defined in claim 1 further characterized by said wall means having a plurality of apertures therein spaced apart along said first section.

3. An air-conditioning system as defined in claim 2 in which said wall means comprises a cylindrical tube closed at its ends.

4 An air-conditioning system as defined in claim 2 characterized by the areas of said apertures being of different values and increasing in areas for those apertures more remote from said sensor.

5. An air-conditioning system as defined in claim 4 further characterized by the sum of the areas of said apertures in said first section being less than the open portion of said second section.

6. An air-conditioning system as defined in claim 2 further characterized by the areas of said apertures being less than the cross-sectional area of the conduit formed by said wall means.

7. An air-conditioning system as defined in claim 1 further characterized by the area of said open portion of said first section being less than the cross sectional area of the conduit formed by said wall means.

8. An air-conditioning system as defined in claim 1 in which said first section of said wall means facing upstream of the airflow in said duct is open so as to admit progressively greater volumes of air as the distance from said sensor is increased towards the end of said wall means remote from said sensor.

9. An air-conditioning system as defined in claim 1 further characterized by said second section of said conduit having an opening facing downstream of the airflow in said duct.

10. In an air-conditioning system including an air duct for conducting air subject to conditioning and blower for moving air through said duct, control means for said air-conditioning system comprising a relatively small sensor element, wall means forming an elongated air conduit extending transversely of a substantial portion of the stream of air flowing in said duct and having a cross-sectional area substantially less than the cross-sectional area of said duct, a said first section of said wall means having means at intervals along a substantial portion of said conduit operative to direct a plurality of segments of said airstream into said conduit, said last mentioned means being operative to introduce progressively larger volumes of said airstream into said conduit at progressively greater distances from an open second section of said conduit said sensor element being located to sense a condition of air exiting through said open second section.

11. An air-conditioning system as defined in claim 10 further characterized by said means along said conduit comprising spaced openings in said first wall section facing upstream of the airflow in said duct, the areas of said spaced openings increasing with increase in distance thereof from said sensor element.

12. An air-conditioning system as defined in claim 11 in which said spaced openings comprise rectangular openings of differing widths.

13. An air-conditioning system as defined in claim 10 further characterized by said second section of said conduit having an opening facing downstream of the air flow in said duct.

* * * * *